(12) United States Patent
Oblak et al.

(10) Patent No.: US 11,995,157 B2
(45) Date of Patent: May 28, 2024

(54) INTELLIGENT LiDAR SCANNING

(71) Applicant: CATERPILLAR INC., Peoria, IL (US)

(72) Inventors: Tod Andrew Oblak, Pittsburgh, PA (US); Shastri Ram, Pittsburgh, PA (US); Jeff T. Stringer, Pittsburgh, PA (US); Sri Sekharan, Pittsburgh, PA (US); Lawrence Andrew Mianzo, Pittsburgh, PA (US); Mark Edward Hartman, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 756 days.

(21) Appl. No.: 17/112,932

(22) Filed: Dec. 4, 2020

(65) Prior Publication Data

US 2022/0180131 A1 Jun. 9, 2022

(51) Int. Cl.
*G01S 13/89* (2006.01)
*G01S 7/481* (2006.01)
(Continued)

(52) U.S. Cl.
CPC .......... *G06F 18/251* (2023.01); *G01S 7/4817* (2013.01); *G01S 7/497* (2013.01);
(Continued)

(58) Field of Classification Search
CPC . G06T 2207/10028; G06T 2207/30164; G06T 7/001; G06T 2207/10012; G06T 7/174; G06T 7/593; G06T 7/80; G06T 2207/20081; G06T 17/05; G06T 2207/10016; G06T 7/11; G06T 7/521; G06T 15/40; G06T 17/20; G06T 19/006; G06T 2207/20228; G06T 2207/30252; G06T 7/12; G06T 7/248; G06T 7/60; G06T 11/206; G06T 15/10; G06T 19/20; G06T 2207/10032; G06T 2207/30208;
(Continued)

(56) References Cited

U.S. PATENT DOCUMENTS 10,345,447 B1    7/2019  Hicks
10,491,885 B1 *  11/2019 Hicks ................... G06V 20/56
(Continued)

FOREIGN PATENT DOCUMENTS

KR       20170049453 A     5/2017

OTHER PUBLICATIONS

Written Opinion and International Search Report for Int'l. Patent Appln. No. PCT/US2021/061523, dated Mar. 31, 2022 (9 pgs).

*Primary Examiner* — Ian L Lemieux

(57) ABSTRACT

An intelligent three dimensional scanner system mountable on a movable machine, including three dimensional scanner, a camera, and control circuitry. The control circuitry is configured to receive three dimensional point data from the three dimensional scanner, receive two dimensional image data from the camera, input the two dimensional image data to a machine learning model, which identifies objects in the two dimensional image data, fuse the three dimensional point data with the identified objects in the two dimensional image data in order to identify the objects in the three dimensional point data, and control a scan pattern to direct scanning resolution of the three dimensional scanner based on the identified objects.

20 Claims, 12 Drawing Sheets

(51) Int. Cl.
*G01S 7/497* (2006.01)
*G01S 17/89* (2020.01)
*G06F 18/214* (2023.01)
*G06F 18/25* (2023.01)
*G06V 10/22* (2022.01)
*G06V 20/56* (2022.01)

(52) U.S. Cl.
CPC .............. *G01S 13/89* (2013.01); *G01S 17/89* (2013.01); *G06F 18/214* (2023.01); *G06V 10/22* (2022.01); *G06V 20/56* (2022.01)

(58) Field of Classification Search
CPC ... G06T 2207/30244; G06T 2219/2004; G06T 7/136; G06T 7/20; G06T 7/75; G06T 7/85; G01S 17/931; G01S 17/42; G01S 17/86; G01S 19/27; G01S 19/41; G01S 19/46; G01S 19/47; G01S 5/009; G01S 7/4811; G01S 19/11; G01S 19/52; G01S 7/497; G01S 17/89; G01S 19/49; G01S 7/4817; G01S 7/4808; G01S 7/4972; G01S 7/4802; G01S 13/867; G01S 13/89; G01S 13/931; G01S 17/88; G01S 7/417; G01S 15/89; G01S 17/87; G01S 7/51; G01S 13/865; G01S 17/04; G01S 17/08; G01S 17/10; G01S 17/66; G01S 17/894; G01S 17/93; G01S 7/4004; G01S 7/4026; G01S 7/403; G01S 7/4034; G01S 7/4091; G01S 7/4813; G01S 7/4815; G01S 7/4816; G01S 7/486; G01S 7/4863; G01S 7/52004; G06F 18/251; G06F 18/214; G06F 18/25; G06V 20/56; G06V 10/44; G06V 20/647; G06V 10/22; G06V 10/25; G06V 10/809; G06V 20/58; G06V 20/70; G06V 2201/06; G06V 10/147; G06V 10/30; G06V 10/757; G06V 10/772; G06V 10/774; G06V 10/803; G06V 10/94; G06V 20/584; G06V 20/64; G06V 20/653; G06N 20/00

See application file for complete search history.

(56) References Cited

U.S. PATENT DOCUMENTS

| | | | |
|---|---|---|---|
| 11,353,559 B2 * | 6/2022 | Campbell | G01S 17/08 |
| 11,676,291 B1 * | 6/2023 | Pandya | G06T 5/009 |
| | | | 382/103 |
| 11,776,215 B1 * | 10/2023 | Cheng | G06T 19/00 |
| | | | 345/419 |
| 2017/0277951 A1 | 9/2017 | Wagner et al. | |
| 2018/0357503 A1 | 12/2018 | Wang | |
| 2019/0213790 A1 * | 7/2019 | Taguchi | G01C 21/3673 |
| 2020/0025935 A1 | 1/2020 | Liang et al. | |
| 2020/0175720 A1 | 6/2020 | Hsu | |
| 2020/0300982 A1 * | 9/2020 | LaChapelle | G01S 17/86 |
| 2021/0201145 A1 | 7/2021 | Pham | G06N 3/08 |
| 2021/0264634 A1 * | 8/2021 | Jelavic | G06T 7/149 |
| 2021/0347378 A1 * | 11/2021 | Nabatchian | G06V 20/56 |
| 2022/0107396 A1 | 4/2022 | Hughes | G01S 7/484 |
| 2022/0163635 A1 * | 5/2022 | Dunn | G01S 17/931 |
| 2022/0187471 A1 * | 6/2022 | Eshel | G01S 7/4865 |
| 2022/0398851 A1 * | 12/2022 | Nehmadi | G01S 17/87 |

* cited by examiner

# INTELLIGENT LiDAR SCANNING

TECHNICAL FIELD

The present disclosure generally is directed toward a system and method of directing three dimensional scanning on specific objects. The system and method can augment the classification of objects and directed scanning with information of objects which may be obtained from a central system or from other machines and personnel.

BACKGROUND

Machines, such as dozers, motor graders, wheel loaders, wheel tractor scrapers, haul trucks and other types of heavy equipment, are used to perform a variety of tasks at a worksite, such as a mining operation. Control of these machines can utilize information received from various machine systems. For example, based on machine movement input, terrain input, and/or machine operational input, a machine can be controlled to complete a programmed task. By receiving appropriate feedback from each of the different machine systems during performance of the task, continuous adjustments to machine operation can be made to ensure precision and safety in completion of the task. In order to do so, some systems may detect objects in three-dimensional space using fusion of multiple sensors to enhance effectiveness and robustness of object detection.

U.S. Published Patent Application No. 2020/0025935 ("the '935 publication") describes a system and a method to improve detection of objects in three-dimensional space using fusion of multiple sensors such as LiDAR, machine learned neural network and integrated geographic map data. The operations include generating, at the machine-learned neural network, a first data stream descriptive of image data and a second data stream descriptive of LiDAR point cloud data. The operations also include executing, at the machine-learned neural network, one or more continuous convolutions to fuse the image features from the first data stream with the LiDAR features from the second data stream. The fusion system can be configured to modify sensor data (e.g., a discretized representation of LiDAR point cloud data) based on semantic road prior data. The semantic road prior data may be obtained from a map system, including a map database. In particular, the fusion system can be configured to modify a discretized representation of the LiDAR point cloud data based on the semantic road prior data by extracting a semantic road region mask from a high definition map and rasterizing the semantic road region mask onto the LiDAR point cloud data as a binary road mask channel. However, the '935 publication seeks very accurate localization of objects by complex execution, at the machine-learned neural network, of continuous convolutions to fuse image features with LiDAR features. Although the '935 publication discloses modifying a discretized representation of the LiDAR point cloud data based on the semantic road prior data, the disclosed operation appears to use conventional LiDAR scanning of an environment surrounding a vehicle, which is understood include a fixed scan pattern and scan frequency.

U.S. Published Patent Application No. 2017/0277951 ("the '951 publication") describes a method and a hybrid 3D imaging device capable of surveying a city to create a 3D model. The device uses a combination of data acquired from LiDAR and a set of point matching algorithms which generate spectroscopic imaging data in order to get high-resolution information. The method is characterized in that at least one of the first to fourth classification criteria being based on a semantic classification, in particular wherein the semantic classification comprises semantic classifiers defining at least one of shadowing, a region with an occlusion, a region with vegetation, and a region with a homogeneous surface, in particular a water surface. Also, the LiDAR data is typically used as supporting data, e.g. for critical areas when generating a 3D point cloud based on stereoscopic imaging. Thus, the acquisition of the LiDAR data might be specifically tuned to be only taken for these critical areas of the city scape, e.g. to reduce requirements on data storage and processing power. For many applications of city modelling a first estimate or a first 3D model of the city might be available before surveying. Then, the scan pattern for acquiring the LiDAR data might be specifically tuned to cover only the critical areas, but e.g. with high resolution, in particular using a Palmer scanning LiDAR device (i.e., conical scan pattern) or a LiDAR device with a fast sweeping mirror. However, the '951 publication seeks to create a 3D model of a city by performing stereoscopic imaging and uses LiDAR data for critical areas of the city scape, i.e., a fixed scan pattern.

SUMMARY

An aspect is an intelligent three dimensional scanner system mountable on a movable machine, including a three dimensional scanner; a camera; and control circuitry. The control circuitry is configured to receive three dimensional point data from the three dimensional scanner, receive two dimensional image data from the camera, input the two dimensional image data to a machine learning model, which identifies objects in the two dimensional image data, fuse the three dimensional point data with the identified objects in the two dimensional image data in order to identify the objects in the three dimensional point data, and control a scan pattern to direct scanning resolution of the three dimensional scanner based on the identified objects.

A further aspect is a mobile work machine, including at least one camera; at least one light detection and ranging device and an associated scanner controller; an embedded machine learning circuit; and control circuitry. The control circuitry is configured to receive in a first frame a two dimensional image from the at least one camera, perform image preprocessing on the received two dimensional image to conform to an input of the embedded machine learning circuit, and use the embedded machine learning circuit to identify objects in the preprocessed two dimensional image, and to semantically label the identified objects. The control circuitry is further configured to receive three dimensional point data from the at least one light detection and ranging device, and fuse the three dimensional point data with the identified objects in the two dimensional image in order to identify the objects in the three dimensional point data. The scanner controller is configured to dynamically adjust a scan pattern to direct high resolution scanning by the at least one light detection and ranging device only on selected ones of the identified objects and to perform low resolution scanning on others of the identified objects.

A further aspect is an intelligent scanning method, including receiving, using a controller, a two dimensional image from at least one camera of a mobile work machine; identifying, using an embedded machine learning circuit, objects in the two dimensional image, and semantically labeling the identified objects; receiving, using the controller, three dimensional point data from a light detection and ranging device of the mobile work machine, fusing, using the controller, the three dimensional point data with the identified objects in the two dimensional image in order to identify the objects in the three dimensional point data, and while the mobile work machine is moving in a worksite, dynamically adjusting a scan pattern of the light detection and ranging device, using a scanner controller of the mobile work machine, to direct high resolution scanning by the light detection and ranging device only on selected ones of the identified objects and to direct low resolution scanning on others of the identified objects.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

LiDAR and 4D Imaging Radar systems are scanner systems that can provide geometric 3D point clouds. The LiDAR and 4D Imaging Radar systems perform scanning which measures many points on the external surfaces of objects. An output of the scanning process is point clouds, which are a set of data points in space. For real-time operation of LiDAR and 4D Imaging Radar in a machine, the scanning process can be subject to data bandwidth (amount of data points obtained in a single scan/frame) and update rate (scan rate/frame rate) limitations.

LiDAR systems have been developed that are electronically controllable allowing for control of scanning frequency and resolution. Faced with data bandwidth and update rate limitations, there is a trade-off between how much of a scene can be scanned with a LiDAR or 4D Imaging Radar at high rate and how much of a scene may be scanned at a lower rate. One approach may be a brute force approach in which the scanning field of view is reduced. The brute force approach can involve reduction of the horizontal and vertical field of view so that the scan rate of an electronically scanning LiDAR can be increased from 4 Hz to 8 HZ, for instance, and resolution in the reduced field of view can be improved. However, reduction in the scanning field of view can lead to other problems, as this can require complex integration of several LiDAR or 4D Imaging Radar systems or performing intermittent scanning of different parts of a scene with one LiDAR or 4D Imaging Radar system.

Generally, embodiments of the disclosed subject matter adjust the scan pattern to direct the maximum angular resolution to areas of high value or interest while directing relatively lower angular resolution to areas of low value and interest, thereby improving both scan frequency and angular resolution while not sacrificing overall coverage.

Figure 1A:
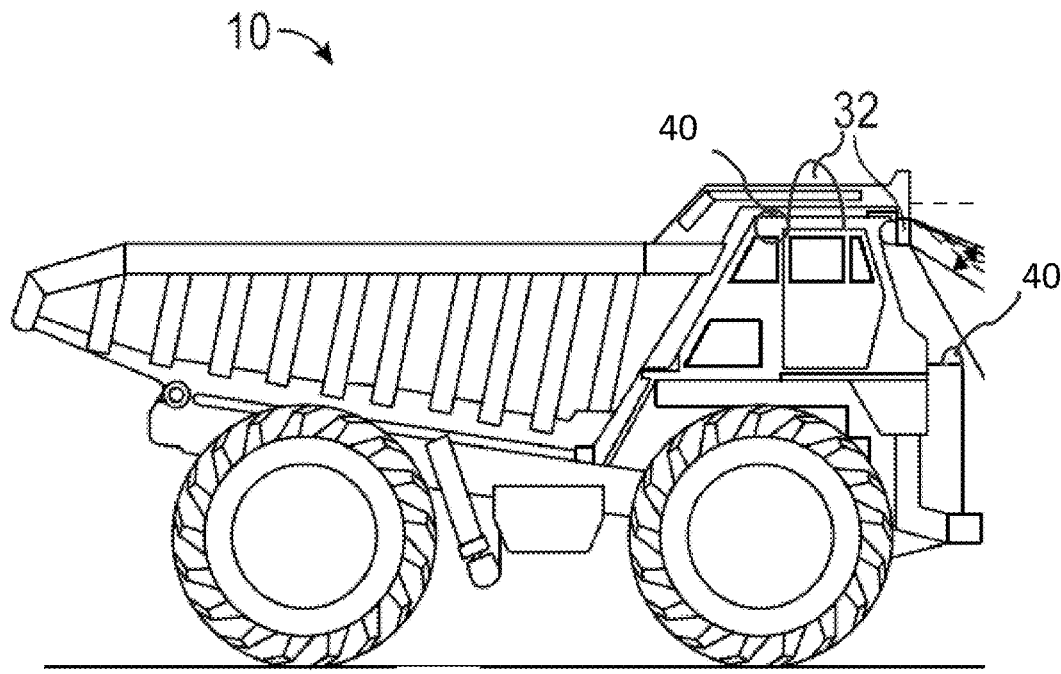
FIGS. 1A, 1B are side and overhead views, respectively, of a work machine according to one or more embodiments of the disclosed subject matter.
Figure 1B:
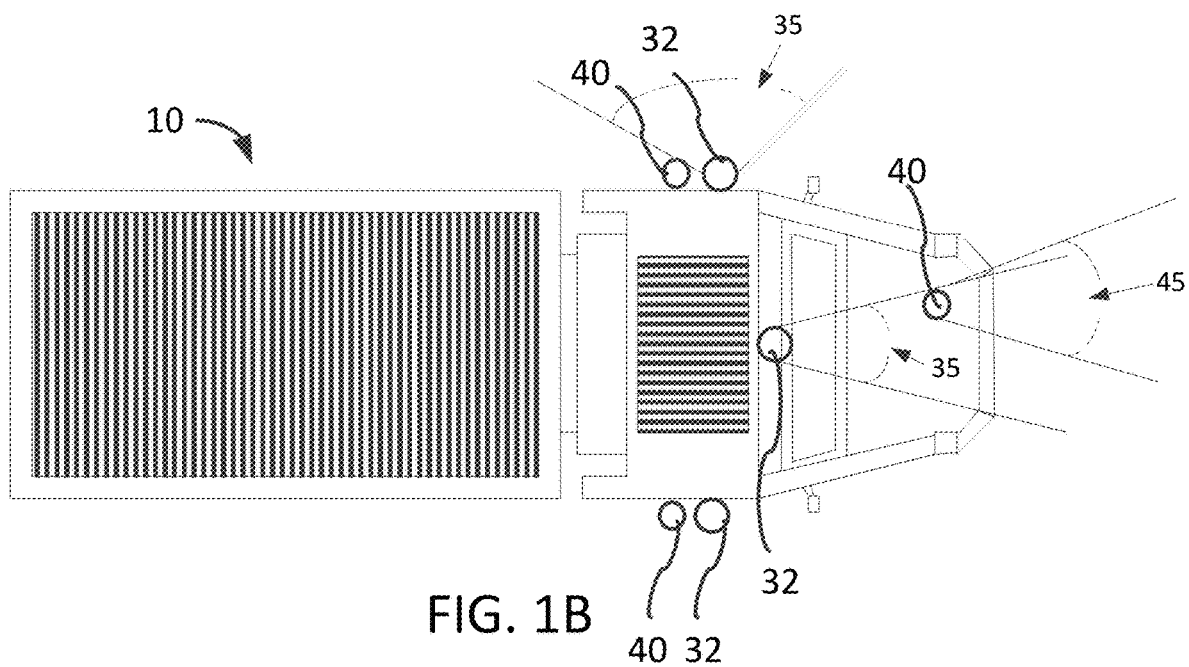

FIGS. 1A, 1B are side and top views, respectively, of a machine 10 according to embodiments of the disclosed subject matter. Although the machine 10 in FIGS. 1A and 1B is represented as a rear haul truck, machines according to embodiments of the disclosed subject matter may include road vehicles, such as passenger cars and freight trucks, tractors, and mining and construction vehicles. The machine 10 may have various external sensors, for instance, to provide information for advanced safety systems and/or various levels of automated driving. The various external sensors may include, but are not limited to, one or more high definition cameras, RADAR sensors, and LiDAR.

Regarding FIGS. 1A, 1B, a three dimensional scanner 32, such as LiDAR or 4D Imaging RADAR, may be mounted on a front portion of the machine 10, for instance, on an upper canopy of the machine 10. The three dimensional scanner 32 may be mounted in other positions on the machine 10 as long as the three dimensional scanner 32 can cover a field-of-view 35 that is sufficient for the size of the machine 10. One or more high definition cameras 40 may be mounted on the machine 10, for instance, on a front portion of the machine 10. The high definition cameras 40 have a field-of-view 45 that may be different from the field of view of the three dimensional scanner 32. FIG. 1B, for instance, shows a high definition camera 40 mounted on a forward frame of the machine 10 in a position separate from the three dimensional scanner 32, though embodiments of the disclosed subject matter are not so limited. Other high definition cameras 40 may be mounted along the side of the machine 10. The cameras 40 mounted along a side of the machine 10 may have a wide field of view for greater coverage, such as about 115 degrees or greater. Other types of machines may include a three dimensional scanner 32 and high definition cameras 40 mounted in a rear of the machine. The three dimensional scanners 32 and high definition cameras 40 may have respective fields of view, 35 and 40. As such, the high definition camera 40 and the three dimensional scanner 32 can have different views of the environment surrounding the machine 10. Also, different types of machines may have three dimensional scanners 32 and high definition cameras 40 mounted at various positions. In order for information of images from the high definition cameras 40 to be associated with information of geometric points from three dimensional scanners 32, a procedure needs to be performed to align the separate pieces of information.

Figure 2:
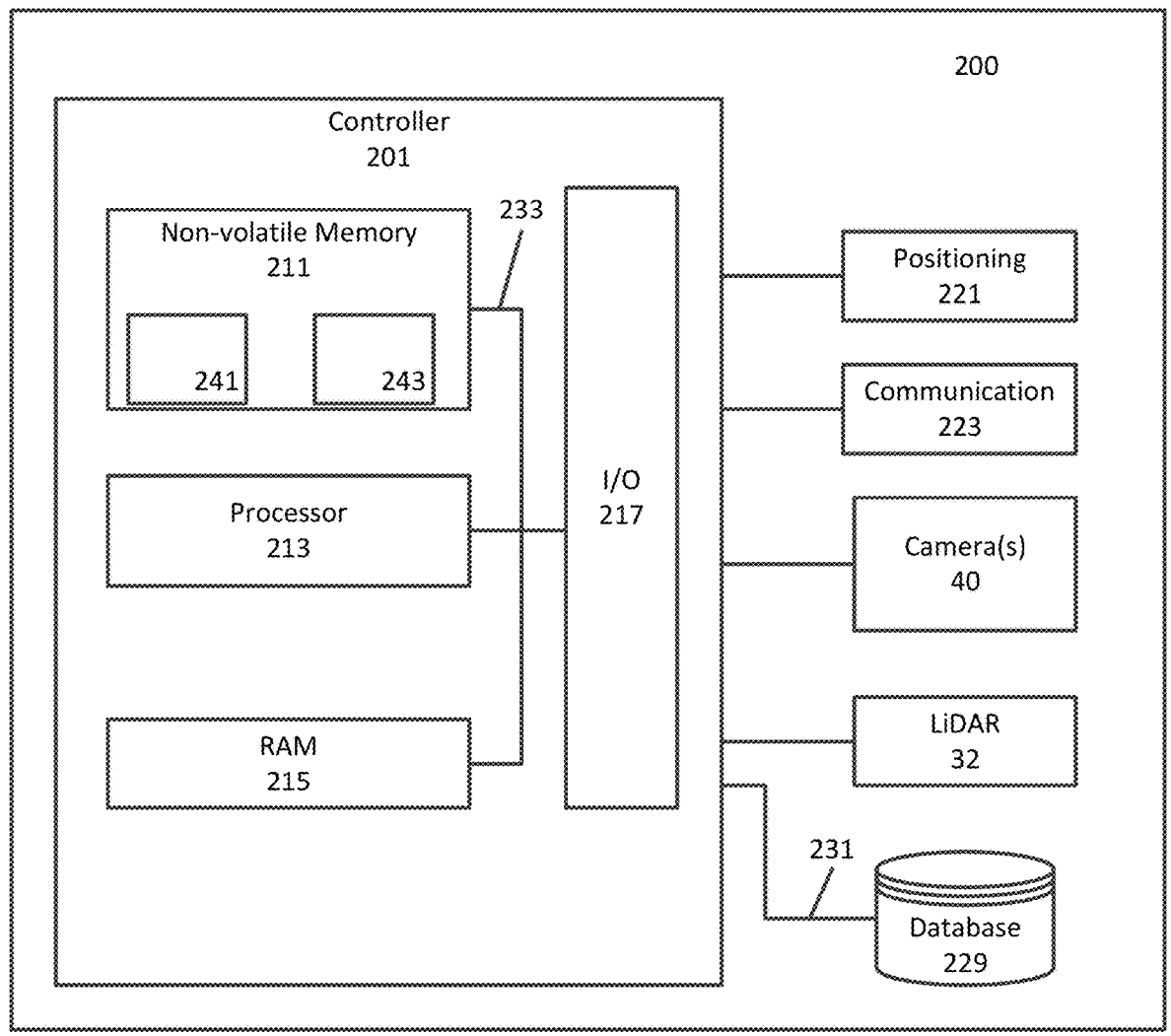
FIG. 2 is a block diagram of a system in accordance with an exemplary aspect of the disclosure.

FIG. 2 is a block diagram of a system 200 for the machine 10. In embodiments, the system 200 may be characterized as an object detection system. p The system 200 may include the three dimensional scanner 32 and a control system 201 (sometimes referred to as a controller 201). In certain embodiments, the control system 201 is in communication with the three dimensional scanner 32 and the machine 10, for example, via wired and/or wireless connections. In embodiments, the three dimensional scanner can use processing by a computer, such as the control system 201, to process 3D point clouds.

The control system 201 can include a positioning system 221 for identifying the position and orientation of the machine 10. In embodiments the positioning system 221 may include a Global Positioning System (GPS), Global Navigation Satellite System (GNSS), inertial sensors, ranging radios, or other perception based localization methods. Such systems may leverage three dimensional scanner 32, camera(s) 40, radars, or stereo cameras.

The control system 201 can be operatively connected to a database 229 via a link 231 connected to an input/output (I/O) circuit 217 of the control system 201. It should be noted that, while not shown, additional databases may be linked to the control system 201 in a known manner. Furthermore, none, some, or all of such databases may be external to the control system 201.

In an example, the database 229 can include three dimensional information of paths of the machine 10 and worksite features, such x, y, z coordinates, or latitude, longitude, and elevation. In an example, the database(s) 229 can include a map or multiple maps of a worksite (or multiple worksites). The term "map" is intended to include digital map data. The map can include location and dimensional data relating to known paths of the machine 10. The map can include location and dimensional data relating to worksite features, such as known path edges. The map can include location and dimensional data relating to detected or known obstacles and adverse conditions along known routes. The map can include longitude and latitude data along with elevation data. .

The system 200 can include a communication module 223 that can provide information to the database 229, such as road information. As will be discussed below, the communication module 223 may provide communications functions for communications with other machines, a cloud service, and/or central computer system.

The control system 201 can include a non-volatile memory 211, processing circuitry 213 (may be called a processor, microcontroller or a microprocessor), a random-access memory (RAM) 215, and the input/output (I/O) circuit 217, all of which can be interconnected via a bus 233. It should be appreciated that although only one processor 213 is shown, the control system 201 may include multiple processors 213. For purposes of this disclosure, processing circuitry may include one or more of Application Specific Integrated Circuit (ASIC), Graphics Processing Unit (GPU), Field Programmable Gate Array (FPGA), and System on Chip. Similarly, the control system 201 may include multiple RAMs 215 and multiple non-volatile memories 211. Although the I/O circuit 217 is shown as a single block, it should be appreciated that the I/O circuit 217 may include a number of different types of I/O circuits. The RAM(s) 215 and the non-volatile memories 211 may be implemented as semiconductor memories, magnetically readable memories, and/or optically readable memories, for example.

The non-volatile memory 211 and RAM 215 can be a non-transitory computer-readable medium having stored thereon computer-executable code (e.g., disclosed software or subroutines) and/or data. The non-volatile memory 211 and/or the RAM 215 may store various applications (i.e., machine readable instructions) for execution by the processor 213.

For example, an operating system 241 may generally control the operation of the control system 201 and provide a computing environment to implement the processes described herein. The non-volatile memory 211 and/or the RAM 215 may also store a variety of software 243 for accessing specific functions of the control system 201.

The software 243 may include code to execute any of the operations described herein. The non-volatile memory 211 and/or the RAM 215 may further store data related to the configuration and/or operation of the control system 201, and/or related to the operation of the software 243.

The control system 201 can be connected to the machine 10 such that information can be sent and received to and from the control system 201 and the machine 10 in order to control the machine 10. The control system 201 receives information from sensors, such as cameras 40, three dimensional scanner 32, positioning system 221 and communication module 223, and can instruct the machine 10 and its components to take actions, such as to control the brakes of the machine 10 or control the steering of the machine 10.

INDUSTRIAL APPLICABILITY

Electronically controlled LiDAR can have a uniform distribution. To control scan pattern, scanning can be adjusted to view a certain direction, for instance, straight ahead or up or down, in order to focus LiDAR points more in that direction. A scan pattern in a certain scanning direction can result in fewer points in the peripheral view. For instance, in such a scenario vertical scan patterns may tend to spread out more.

As an example, electronically controlled LiDAR may produce fewer points in the lower center area of the field of view, which can result in fewer points in the sky and on the top of a highwall provided in a scanning area around the machine. However, a relatively large number of points would be provided toward a center portion of the field of view. As such, there would be a great number of points on the remaining portion of the highwall, and possibly fewer points on the road, that is directly in front and in the lower center area. Since a relatively high amount of information of the highwall may not be necessary, but a relatively high amount of data points for the road in front can be beneficial or even necessary, the distribution of data points based on focus toward the center of the field of view may not be desirable.

Additionally, determining areas of high value of interest, such as a road, may be accomplished by identifying objects in a scene. However, object classification techniques, such as machine learning, are typically performed using 2D image data of limited resolution, i.e., typically 512×512 pixels, partially due to a need to train a machine learning model in a reasonable amount of time and memory limitations. Machine learning models applied to high resolution images may be complicated (i.e., have a large number of parameters) and/or may not be performed in a sufficient time frame (e.g., hours instead of fractions of a second). Also, although convolution neural networks can be used for 2D object detection, such networks may not be suitable on 3D point cloud due to relatively sparse sensor data.

Embodiments of the disclosed subject matter can dynamically determine which areas of a scene should be scanned at the maximum angular resolution. By using semantic fusion of semantic labeled objects obtained using machine learning and three dimensional scanner geometric point clouds, the scan pattern of a field of view can be dynamically adjusted to direct the highest resolution scanning of the three dimensional scanner to most important regions of interest. This can improve both scan frequency and angular resolution while not undesirably sacrificing overall coverage.

Figure 3:
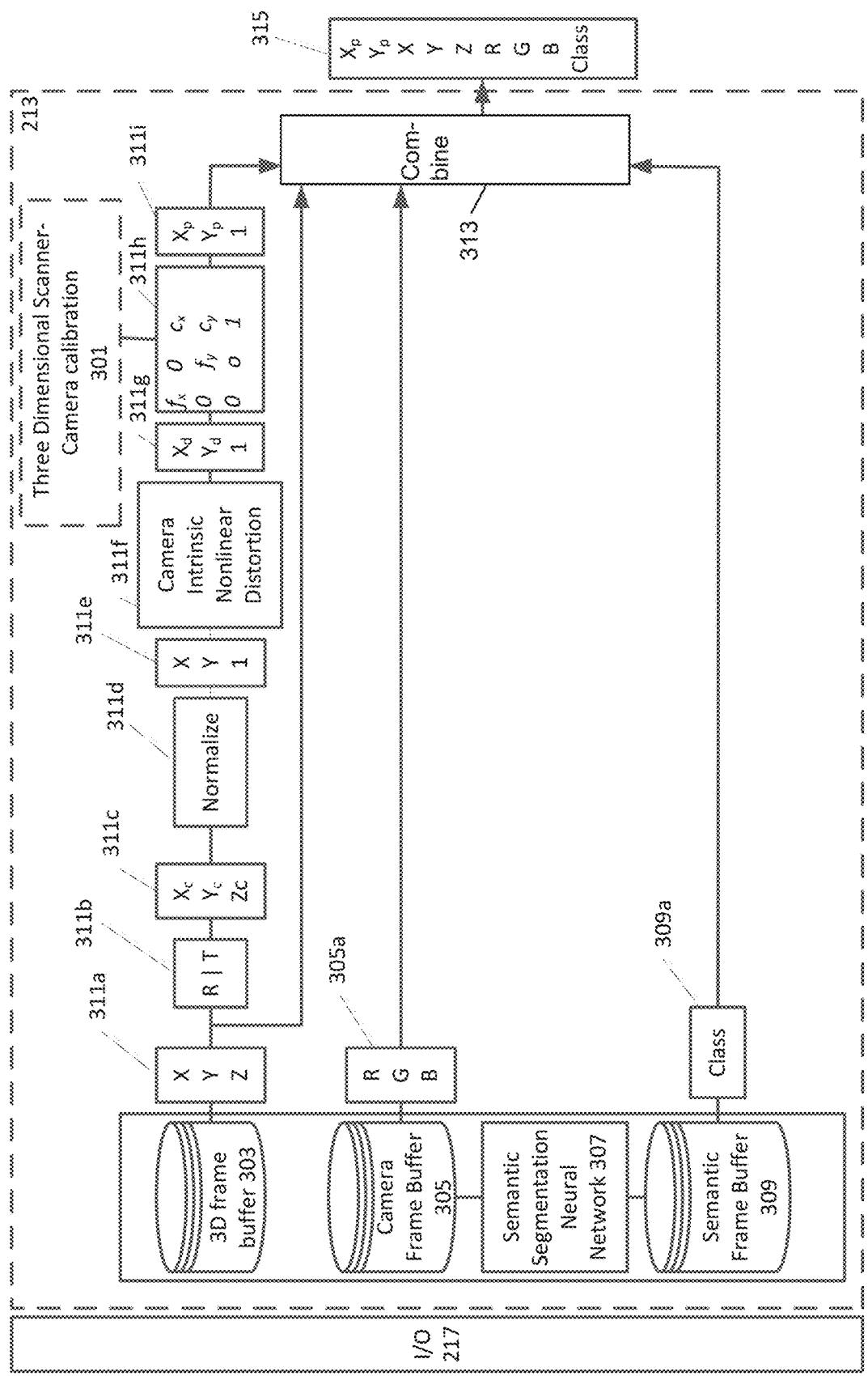
FIG. 3 is a flow diagram of semantic labeling of 3D point clouds in accordance with an exemplary aspect of the disclosure.

FIG. 3 is a flow diagram 300 of semantic labeling of 3D point clouds in accordance with an exemplary aspect of the disclosure. The 3D point clouds may be provided by a three dimensional scanner including a LiDAR or 4D Imaging RADAR system. The semantic labeling of 3D point clouds may be performed by processing circuitry 213.

Generally, LiDAR uses laser light to measure the distances to the surface of target objects, and hence has been referred to herein as a light detection and ranging device. A target is illuminated with laser light, which could be ultraviolet, visible, or near-infrared, and the reflections can be measured with a sensor of the LiDAR. A LiDAR performs scanning with the laser light at a scan rate. LiDAR scan rates can range from 5 Hz to 40 Hz, for instance. A LiDAR can scan a field-of-view with a constant pattern and with uniform power, which is referred to as resolution. A field-of-view may include a vertical range and a horizontal range, and may also include an angular resolution (i.e., number of measurements in predefined geometric segment, such as a 1 degree by 1 degree segment). Further, a LiDAR has a detection range, which is a maximum distance that the system can detect an object. The maximum detection range may be, for example, from 100 meters to 200 meters. As such, a LiDAR can collect large amounts of data from its surroundings and send the data as inputs to the control system 201.

The method and system of this disclosure could also work with electronic scanning 4D Imaging RADAR. RADAR has a long effective range out to about 100 meters. Similar to LiDAR, RADAR can provide points in 3D space and scanning can be adjusted using electronic scanning.

The method and system of this disclosure dynamically adjusts the scan pattern to direct maximum resolution scanning particular objects. Maximum resolution scanning, also referred to herein as high resolution scanning is the highest number of measurements in the predefined geometric segment that a LiDAR or 4D Imaging RADAR can perform. The highest resolution scanning that the LiDAR or 4D Imaging RADAR can perform is implementation dependent. As an example, an angular resolution of 0.1 degrees by 0.1 degrees provides 100 measurements per 1 degree by 1 degree segment. Scanning in a region that is 40 degrees vertical and 120 degrees horizontal will amount to 400 points vertically by 1200 points horizontally, or 480,000 data points per scan. For a scan rate (frame rate) of 20 Hz, the 480,000 data points at 20 Hz results in 9.6 million points per second. In some embodiments, high resolution scanning is defined as angular resolution of about 100 measurements per 1 degree by 1 degree segment, but may be higher depending on the LiDAR or 3D Imaging RADAR implementation. Low resolution scanning is defined as angular resolution of 10 or fewer measurements per 1 degree by 1 degree segment. Regular resolution scanning is defined as the range between high resolution scanning and low resolution scanning.

Two sensors, such as a camera 40 and LiDAR 32 or camera 40 and 4D Imaging RADAR are positioned separately at different locations on the machine 10, and may be positioned differently on different types of machines. Also, there may be multiple cameras 40 and multiple LiDAR 32 or 4D Imaging RADAR systems. In order to fuse information in 2D camera images from a camera 40 and 3D point clouds from the LiDAR 32 or 4D Imaging RADAR, the positional relationship of the two sensors relative to each other and to the machine's environment can be determined.

Regarding FIG. 3, in 301, a calibration procedure is initially performed to find the geometric relationship and a translation relationship between particular mounted sensors, i.e., the camera 40 to the LiDAR 32 or 4D Imaging RADAR, and the geometric relationship between the mounted sensors and the machine 10. In some embodiments, the calibration procedure 301 may later be verified in the field, for example, in a case where the cameras 40 and/or LiDAR 32 require adjusting or are repositioned at new mounting points. The machine's 10 3D position on the surface may be determined using a global positioning system (GPS). Also, the machine 10 may have an Inertial Measurement Unit (IMU) which may be used to determine its orientation and velocity in the world, in terms of three angles roll, pitch, yaw. The position and orientation of the machine 10 along with verified camera-LiDAR calibration parameters can be used to map LiDAR points into the image(s) captured by the camera 40.

Point clouds received from the LiDAR 32 or 4D Imaging RADAR can be stored in a 3D frame buffer 303. In synchronization, images from the camera(s) 40 can be stored in a camera frame buffer 305. A semantic segmentation neural network 307 can be used to classify objects found in the camera images. The camera images may be subject to image preprocessing, including down sampling, cropping the image to match the input to the machine learning model (e.g., number of pixels), or reduction of dynamic range, for instance, prior to being provided to the semantic segmentation neural network 307. Reduction of dynamic range may be performed by removing least significant bits in image pixels. The semantic segmentation neural network 307 may apply semantic labels to classified objects and store each semantically labeled image in a semantic frame buffer 309. The semantically labeled images may be fused with geometric 3D point clouds to obtain semantically labeled point clouds. The semantically labeled point clouds may be for objects including roads, berms, people, vehicles, highwalls, trees, sky, and other landscape features, for instance, at a worksite of the machine 100. The LiDAR 32 or 4D Imaging RADAR can use the semantically labeled 3D point clouds to direct maximum resolution scanning by laser light. The control system 201 can then instruct the machine 10 and its components, such as to control the brakes of the machine 10 or control the steering of the machine using information of the 3D point clouds.

The processor 213 may fuse semantically labeled images with geometric 3D point clouds by spatially and temporally synchronizing and aligning frame buffers for 3D frame data, camera images, and semantic labeling of objects in the images. A frame of 3D point cloud data 311a, a frame of 2D image data 305a, and corresponding object semantic class data 309a are synchronized. The frame of 3D point cloud data 311a may be transformed by a rotation and translation matrix 311b to obtain 3D points 311c in a camera reference frame. The 3D point data may be normalized 311d to obtain normalized points 311e. A camera intrinsic nonlinear distortion function 311f may be applied to obtain distorted normalized points 311g. A calibration matrix 311h produced by a three dimensional scanner and camera calibration process 301 may be applied to obtain 3D point data 311i projected into the 2D image. In 313, the processor 213 may combine the projected 3D point data, 2D image data 305a, and object semantic class data 309a and output 315 the combined data (Xp, Yp, X, Y, Z, R, G, B, Class).

Figure 4:
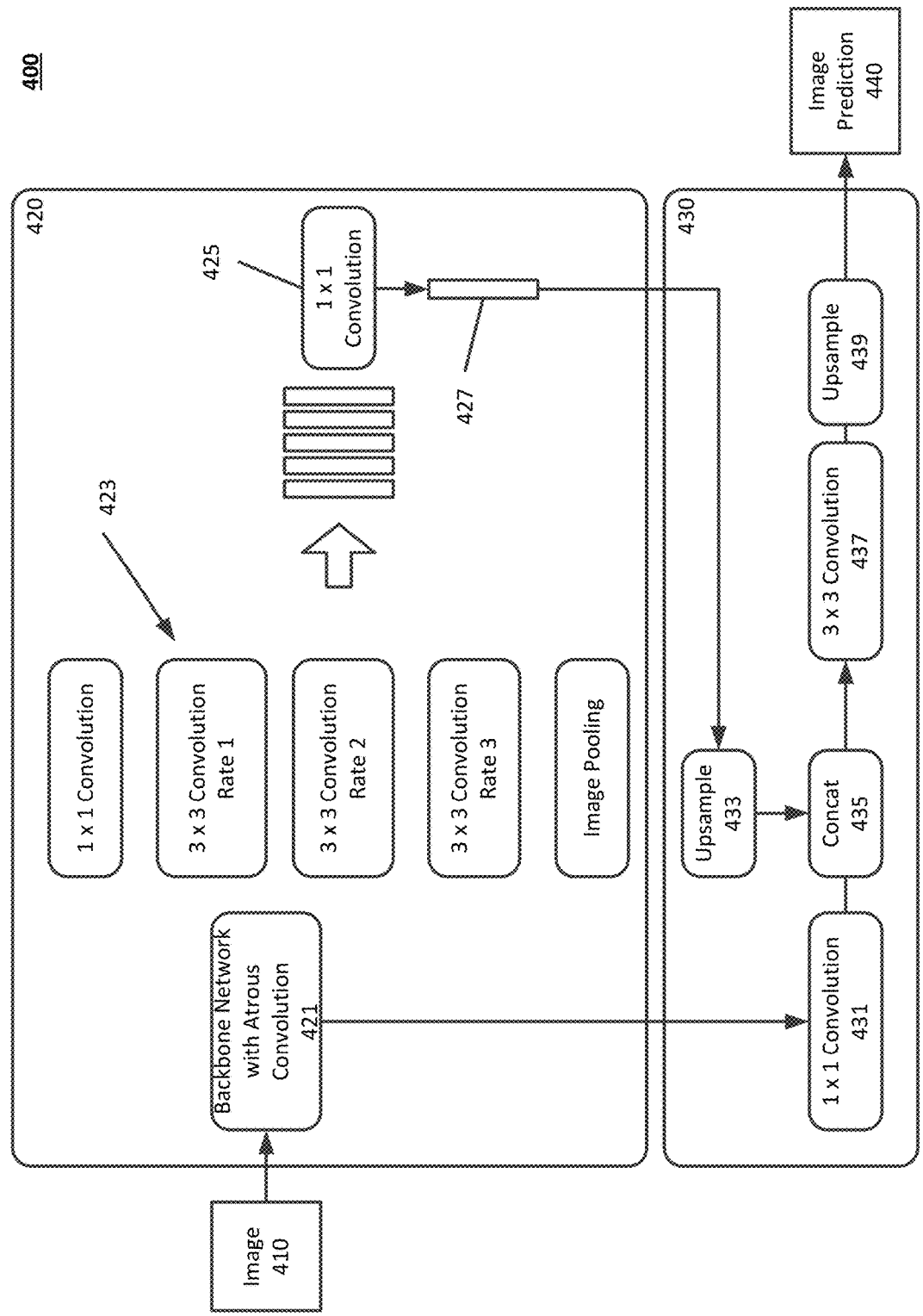
FIG. 4 is a diagram of a machine learning architecture in accordance with an aspect of the disclosure.

FIG. 4 is a diagram of an architecture of an artificial neural network for semantic image segmentation in accordance with an exemplary aspect of the disclosure. In some embodiments, a machine learning system for semantic image segmentation can be one or more of various types of machine learning models, for example, neural networks, support vector machines, decision trees, ensemble models, k-nearest neighbors, Bayesian networks, or other types of models. Example neural networks include feed-forward neural networks, convolution neural networks, recurrent neural networks, or other neural network architectures.

In some embodiments, the machine learning system can train a machine learning model. The machine learning model may be trained using the back propagation algorithm or other supervised learning technique using a set of labeled data. In some embodiments, the machine learning model may be trained using unlabeled training data. The machine learning model may be trained for generalization, including incorporating weight decays, dropouts, or other techniques.

Several artificial neural network methods have been proposed for object detection and semantic segmentation. One method is the Region-based Convolution Neural Network (R-CNN). The R-CNN method is an approach to bounding-box object detection. R-CNN generates a number of candidate object regions and independently evaluates convolution networks on each region of interest. A Faster R-CNN has been proposed that generates candidate object regions with a Region Proposal Network. A further approach is to add a branch to the Fast R-CNN to output an object mask. The object mask encodes an input object's spatial layout. A non-limiting implementation of an artificial neural network is provided in FIG. 4.

Referring to FIG. 4, the architecture of the artificial neural network 400 for semantic image segmentation may be a fully convolutional neural network that increases the receptive field without reducing the spatial dimension in order to optimize segmentation tasks. The artificial neural network 400 may be implemented as an encoder 420 and decoder 430 to take a 2D image 410 to produce a prediction 440 of segmented object instances in the 2D image. The encoder 420 of the architecture 400 may include a backbone network 421 (e.g., VGG, DenseNet, ResNet) to extract features. An atrous convolution may be used in the last few layers of the backbone to control the size of the feature map. Atrous Spatial Pyramid Pooling (ASPP) network 423 is used to classify each pixel corresponding to their classes. The output of the ASPP network is passed through a 1×1 convolution function 425 to get the actual size of the image.

A decoder module 430 further refines the segmentation results 427. A 1×1 convolution function 431 is applied to low level features from the atrous convolution 421. The segmentation results 427 are upsampled in an upsampling function 433 and concatenated in a concatenation function 435 with the low level convolved features. The concatenated features are again convolved in a convolution function 437 and upsampled in an upsampling function 439 to obtain the final segmentation results 440 as an image prediction.

In some embodiments, the artificial neural network 400 may be trained off-line in a cloud service (e.g., Amazon Web Services), in a computer workstation (e.g., a workstation configured for Artificial Intelligence), or a desktop computer configured with a graphics processing unit (GPU) and associated software for artificial intelligence programming using the GPU. In some embodiments, a trained artificial neural network 400 may be executed as an embedded process in the processor 213.

An input image 410 to the artificial neural network 400 may be an original image obtained from a camera 40, or may be an image that is subject to pre-processing. The image that is input to the artificial neural network 400 can be a 512×512 pixel image, for instance. The size of the input image may be larger or smaller depending on the computational resources of the processor 213, program memory 211, and RAM 215 including processing power and memory to handle object classification in real time. The input image may undergo pre-processing including image segmentation, for instance, in order to divide the image into regions depicting objects.

Figure 5:
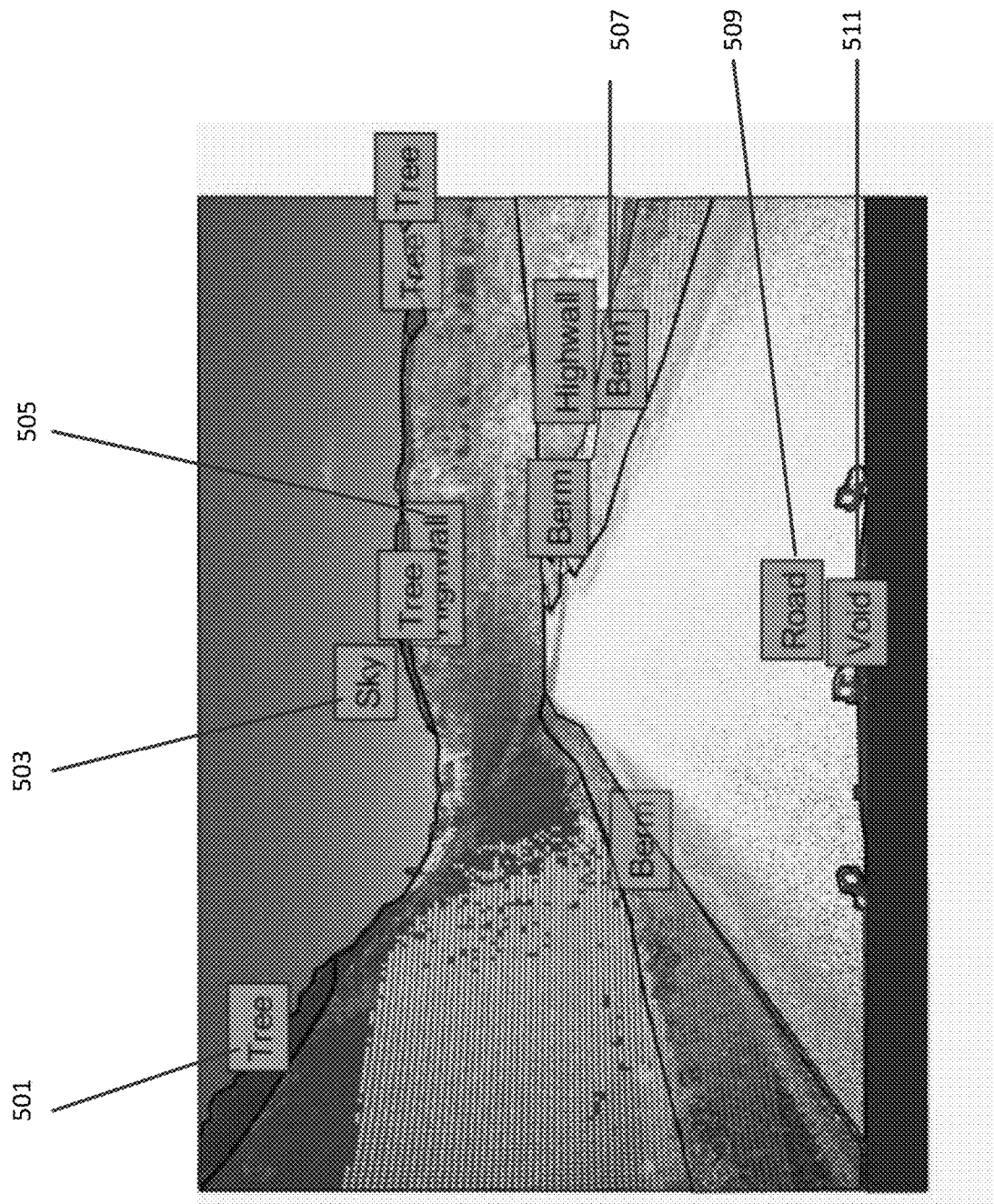
FIG. 5 illustrates a semantically labeled image as a result of classification performed in a machine learning model according to embodiments of the disclosed subject matter.

The training of the artificial neural network 400 may be performed using a dataset of images with segmented objects. The artificial neural network 400 can require training with a relatively large number of images which are manually labeled. FIG. 5 illustrates a semantically labeled image for training the artificial neural network 400. The artificial neural network 400 is trained by inputting images, such as in FIG. 5, in which segmented objects have semantic labels. Semantic labels may include tree 501, sky 503, highwall 505, berm 507, road 509, and void 511, among other geographic objects. The void 511 represents a region that is not a geographic object, such as a hood of a vehicle that obstructs the view of the camera.

Figure 6:
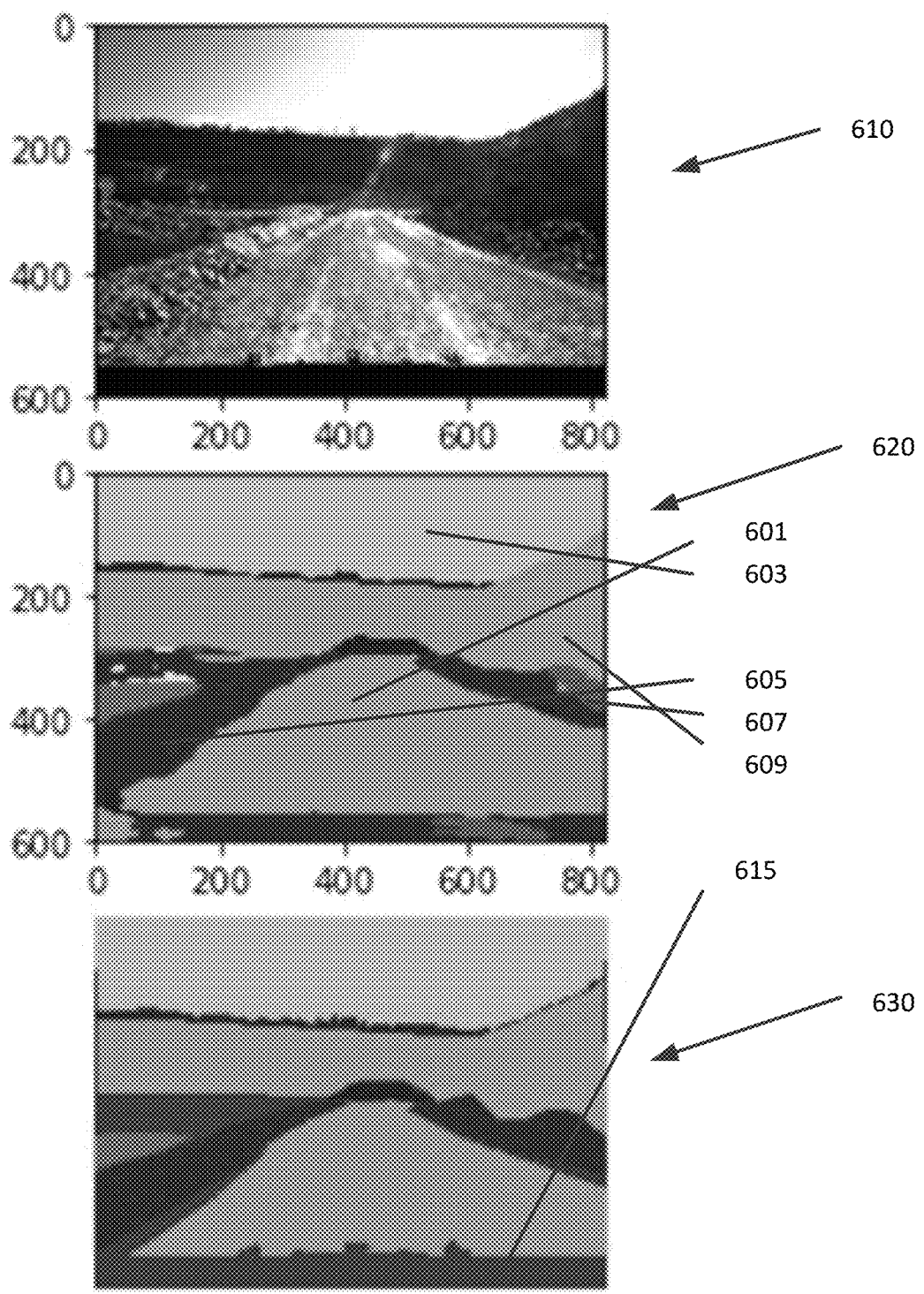
FIG. 6 illustrates an exemplary segmentation object.

FIG. 6 illustrates an example of segmented objects 450. The original image is 610, while 620 and 630 are examples of segmented objects. The original image 610 may be provided as an input 410 to the artificial neural network 400, while segmented objects 620, 630 may be example outputs 450 of the artificial neural network 400. In some embodiments, segmented objects of an image may be coded for each of the object classes. Coding may include a color coding or a gray scale coding. For instance, segmented objects of the sky 603 and a road 601 may be coded using cool colors, while segmented objects of obstacles, such as berms 605, pile 607, highwall 609 may be coded using warm colors. An invalid or void object 615 may be coded using dark grey, for instance. An invalid or void object may be a part of an image that is obscured by, for example, a hood of the machine 10.

In some embodiments, the input 410 may be a sequence of three or more images for motion video. The images in FIGS. 5 and 6 may demonstrate an early output of what the artificial neural network may produce. A trained artificial neural network may show fairly high confidence, e.g., can predict and object, such as the road, with about 96% accuracy.

As noted above, camera 40 can be a high resolution camera. A high resolution camera 40 may produce an image having greater number of pixels than an artificial neural network may be configured to handle. For example, a high resolution camera may produce an image of 4112×3008 pixels. The artificial neural network 400 may be an embedded neural network configured for an input image of 512×512 pixels. In such case, the image that is passed into the artificial neural network 400 may be down-sampled. Down-sampling typically refers to a (anti-alias) filtering operation combined with a removal of pixels, and usually maintains the same field of view of the original image. For example, down-sampling by 2 (which does not have to be an integer) would typically take every other pixel going across and every other row, resulting in an image that looks like the original image region (in terms of field of view), but has half the pixel resolution in the x direction and half the pixel resolution in they direction. So a 1920×1080 image becomes a 960×540 image for example. In such case there is a trade-off between image size and image resolution, but the field of view is preserved. For input to the artificial neural network 400, the image may be down-sampled to an image that is 512×512 pixels. The image with down-sampled resolution is generally sufficient for objects that are near the camera 40, for example, 25 meters or less. However, if an object is farther away from the camera, say 200 meters from the camera 40, then only about 15 pixels (i.e., 15 pixels in height) may represent that object. Thus, for objects that are at a relatively far distance from the camera 40, it would be preferable to use the full high resolution images for object detection. One approach may be to crop the full high resolution image to extract a rectangular horizontal strip of several 512×512 pixel images, and send these images into the artificial neural network 400, to be able to detect an object that is far away. Not all objects are important enough to necessitate detection. However, some objects may have potential to cause damage or may lead to possible dangerous conditions. Also, an object may be a person or persons, or another machine in which detection is essential, especially when a machine is traveling at high speed. In some embodiments, objects that the artificial neural network 400 has been trained to detect may be assigned predetermined importance levels. Some objects, such as sky, tree, and highwall may be assigned a low importance. Objects that may have potential to cause damage or may lead to dangerous conditions, including objects in the road, other vehicles or persons may be assigned a high importance level. Objects such as berms may be assigned a medium importance level. In one embodiment, importance levels may be expressed as a range of 1 to 5, where 5 is of highest importance.

Figure 7:
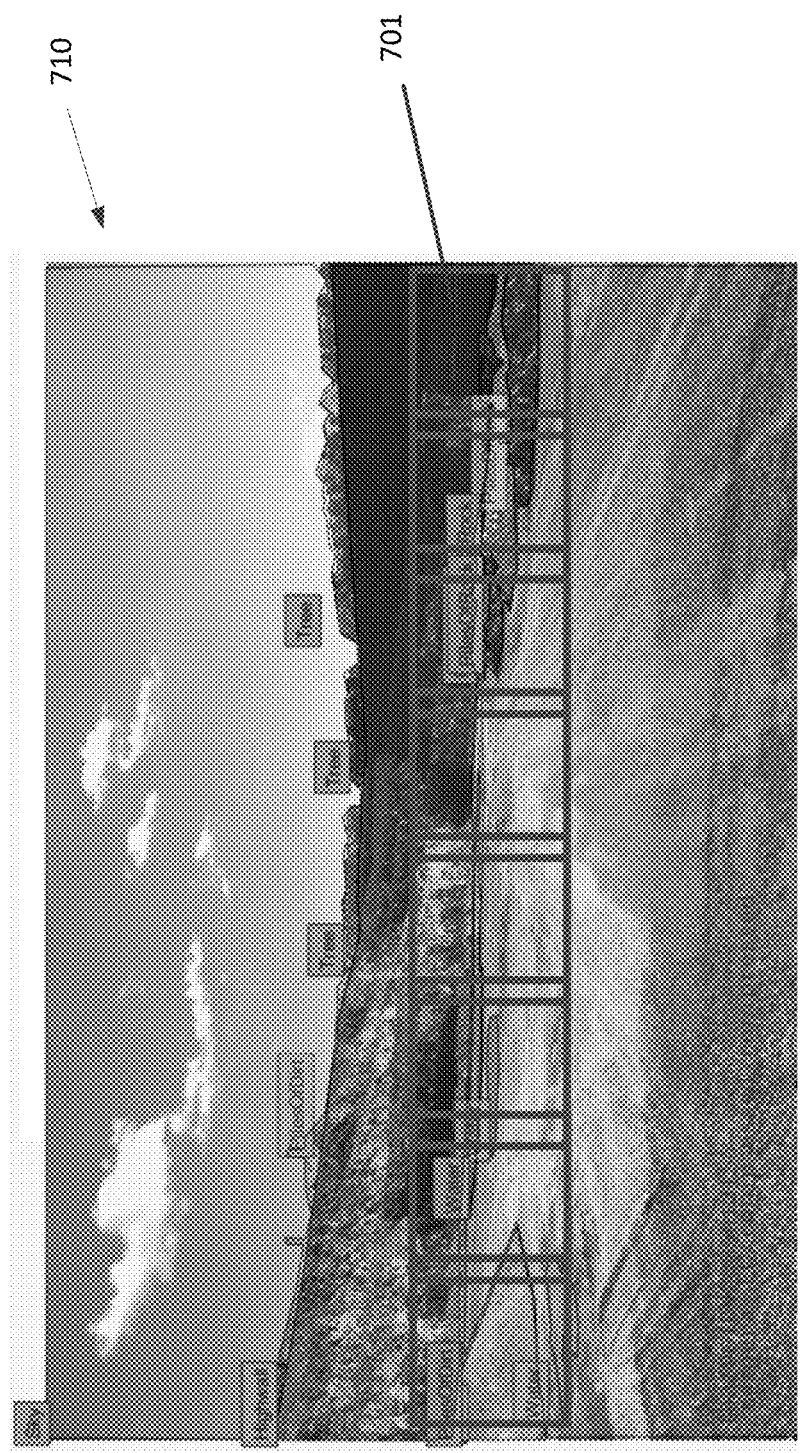
FIG. 7 illustrates an original image with a horizontal strip of the high resolution image.
Figure 8:
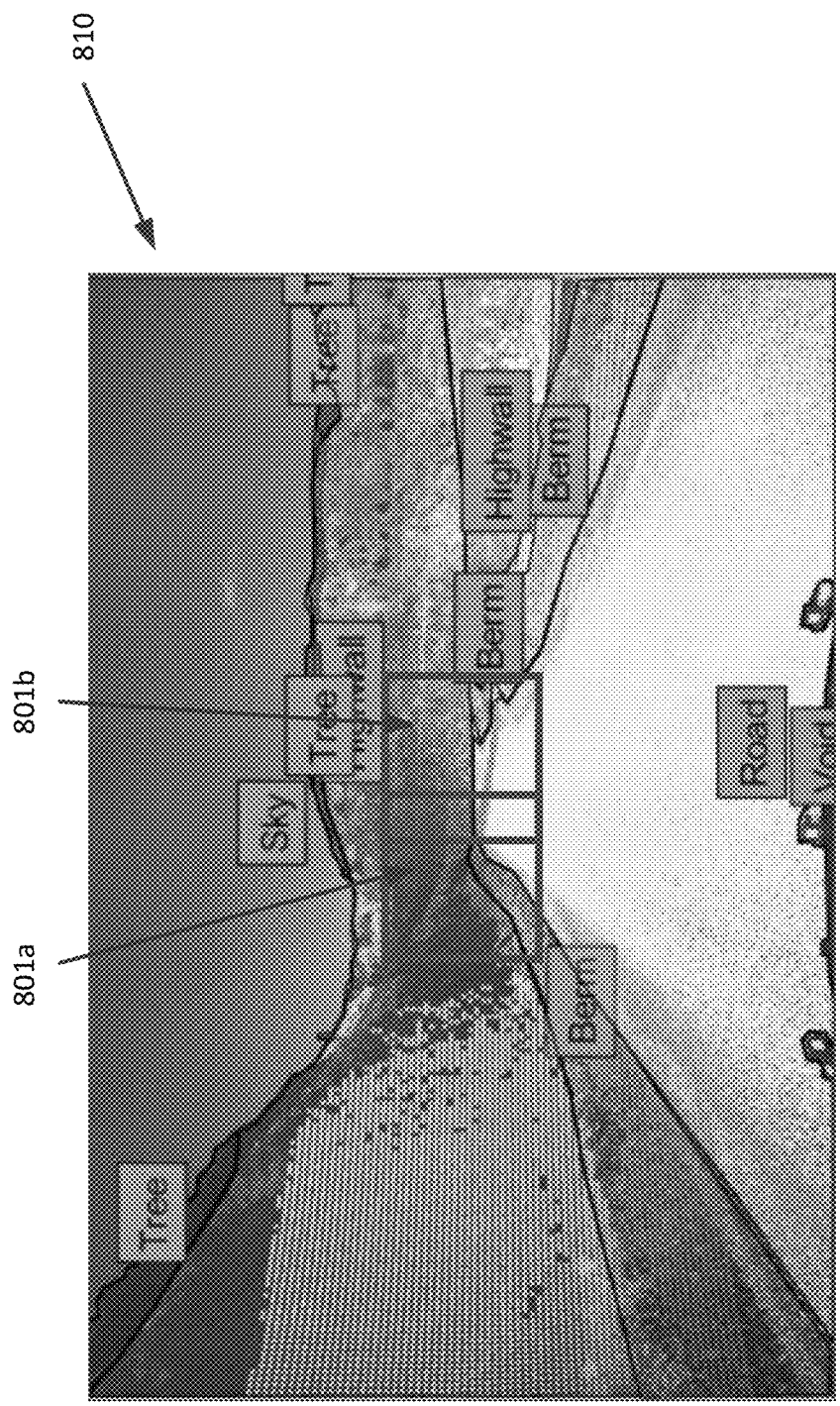
FIG. 8 is an exemplary image illustrating two high resolution cropped images.

FIG. 7 shows an original image with a horizontal rectangular strip of the high resolution image. In the example case, the area in the field of view is a large wide open area. It may be preferable to send overlapping images in an entire horizontal strip 701 of the high resolution image 710 to the artificial neural network 400. However, with semantic information, it may only be necessary to send a region of interest, or particularly to send one or two, or maybe three at the most, cropped high resolution rectangular images extracted from the full high resolution image. FIG. 8 is an exemplary image illustrating two overlapping cropped high resolution rectangular images 801a, 801b extracted from the full image 810 that may be sent to the artificial neural network 400 for semantic classification.

Figure 9:
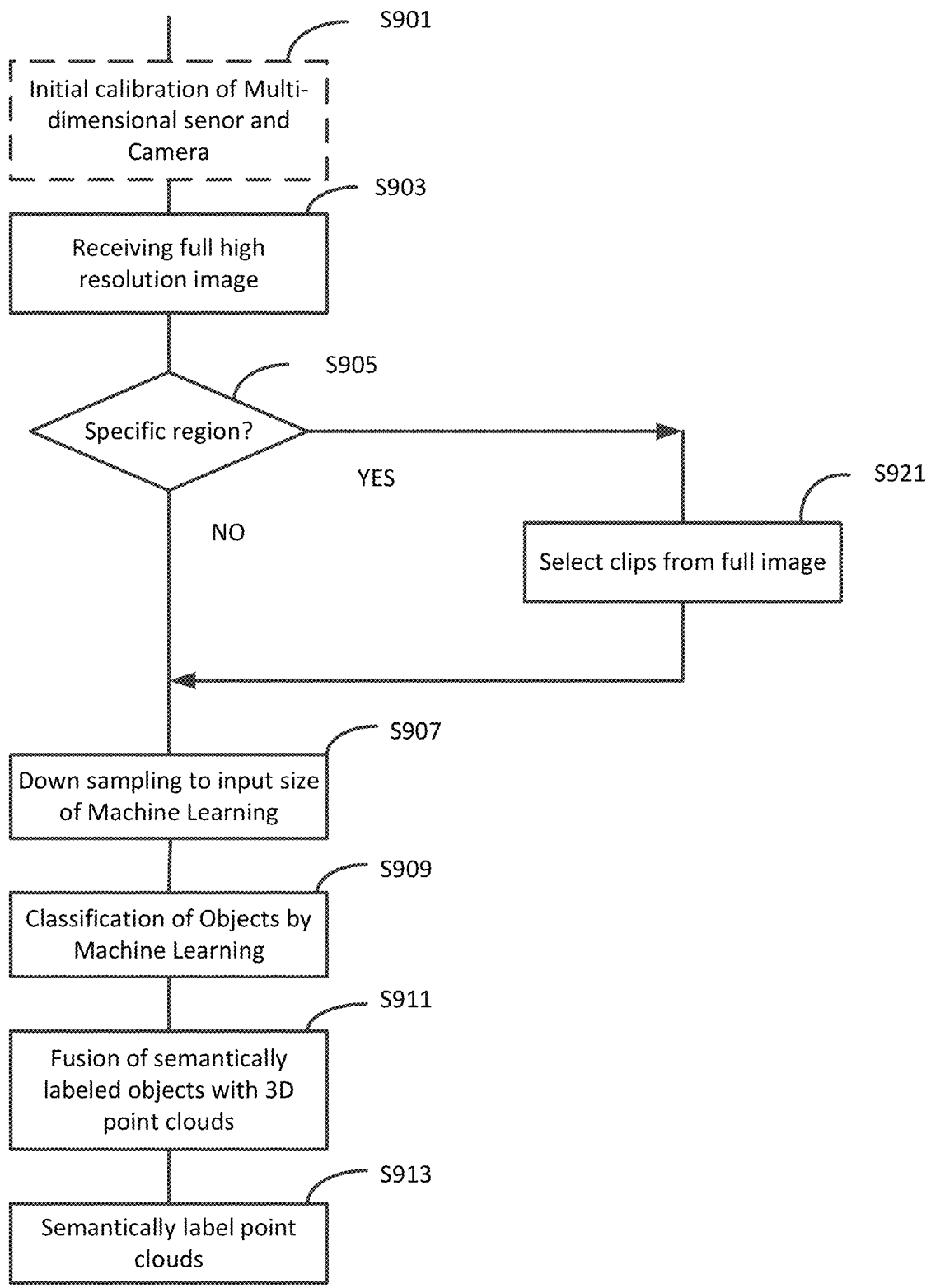
FIG. 9 is a flowchart of a method for scanning in accordance with an exemplary aspect of the disclosure.

FIG. 9 is a flowchart of a method for semantically labeling 3D point clouds in accordance with an exemplary aspect of the disclosure.

Semantic information can be determined using a machine learning model applied to 2D photographic images and used to dynamically adjust the scan pattern of the LiDAR to direct scanning such that scanning of high resolution is performed on predefined high-importance objects including roads, berms, and other vehicles, while scanning at low resolution is performed on predefined low-importance objects including highwalls, trees, sky. In some embodiments, scanning at high resolution may be directed to people or potentially hazardous objects, including moving objects or oncoming vehicles.

In S901, an initial calibration is performed by determining the positional relationship of the LiDAR, the camera, and the machine so that 3D point cloud information may be fused with semantic labeled 2D image data.

In S903, the processor 213 receives full high resolution images from a camera 40 at a predetermined frame rate. In some embodiments, the machine 10 may be traveling on a road while the camera 40 is capturing images and the LiDAR 32 or 4D Imaging RADAR are scanning in a field of view of the LiDAR or 4D Imaging RADAR. In the embodiments, the machine learning model 309 has been trained by supervised learning using a dataset of images having manually applied object class labels.

In S905, the processor 213 makes a determination as to whether the full high resolution image or a cropped image from the high resolution image will be sent to the machine learning model 309. The determination may be made based on a previous semantically labeled image frame.

If the processor 213 determines that the full resolution image is to be sent to the machine learning model 309 (NO in S905), in S907, the processor 213 may perform down sampling of the image so that the number of pixels matches the size of the input to the machine learning model 309. In S909, the machine learning model 309 will be executed to output a segmented image with object labels. The segmented image may be one or more object masks 450 and associated object class labels 441. In S911, the semantically labeled objects undergo a fusion process 311 with 3D point clouds received from the LiDAR 32 or 4D Imaging RADAR.

In S913, the processor outputs one or more semantically labeled point clouds. If the processor 213 determines that a specific region of the full image is to be sent to the machine learning model 309 (YES in S905), in S921, the processor 213 may perform a preprocessing image cropping operation that crops the full image to extract a cropped rectangular image. The image cropping operation may be repeated to obtain one or more cropped images from the full image. The cropped images may each match the number of pixels of the input to the machine learning model 309. Steps S909, S911, S913 can be performed on the cropped images.

The scan pattern of the LiDAR 32 or 4D Imaging RADAR may be dynamically adjusted to direct (or redirect) scanning based on semantically labeled point clouds. In particular, instead of a fixed scan pattern, the LiDAR scan pattern may be varied to focus on a particular labeled point cloud or point clouds. In one embodiment, a bounding box surrounding the point cloud is scanned at an increased number of points. Also, the scan rate in the bounding box for the point cloud may be increased. For example, the scan rate may be increased from 10 to 20 Hz, for instance. Low resolution scanning may be performed for remaining regions of the LiDAR field of view.

The LiDAR or 4D Imaging RADAR scan pattern may be conducted at high resolution for particular objects such as road, berms, and other vehicles. LiDAR or 4D Imaging RADAR scanning at maximum resolution may be conducted for particular obstacles such as people or possible hazardous objects. LiDAR or 4D Imaging RADAR scan pattern may be conducted at low resolution for objects that may not affect operation of the machine 10, such as highwalls, distant trees, and sky. A list of objects and scan priority (importance level) may be maintained in database 229.

In some embodiments, frame update rates (scan rates) may be adjusted for different high resolution scanning regions of the LiDAR 32 or 4D Imaging RADAR. High resolution scanning regions that are processed by the LiDAR or 4D Imaging RADAR system may include various requirements for frame update rates. For example, the area around the machine 10 that a scanning field of view corresponds to may contain objects that are of particular interest to the operation of the machine 10. The machine may require that the LiDAR 32 or 4D Imaging RADAR scan behind the machine 10 while the machine is moving forward, but the scanning behind the machine may not have to be updated more than one per second. In another example, if the machine 10 is moving fast in the forward direction, it may be important for the LiDAR 32 or 4D Imaging RADAR to continuously scan high resolution regions in the forward direction, especially the regions that are for far distances, but only occasionally scan a high resolution region in a side or rear view of the machine 10.

Figure 10:
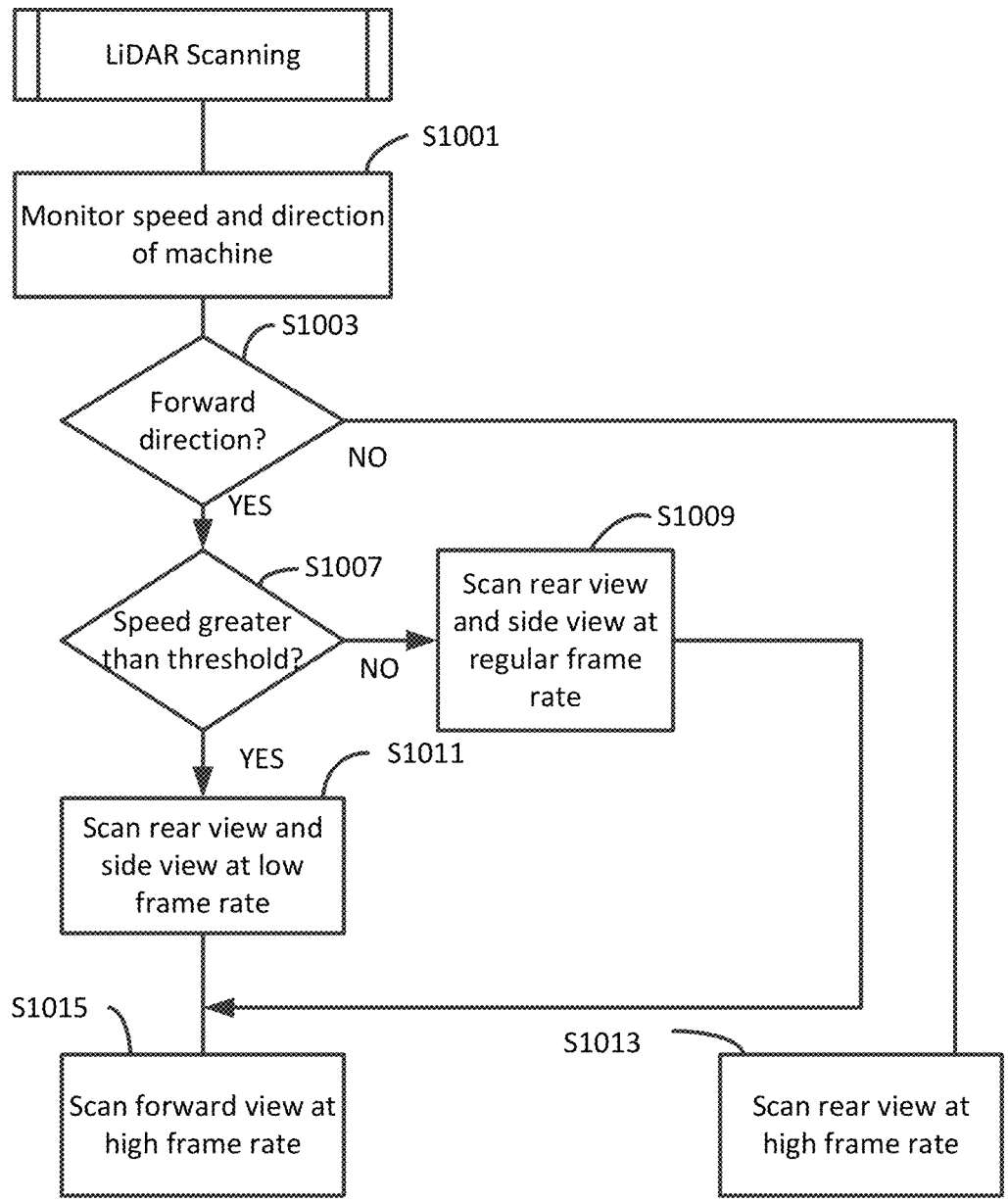
FIG. 10 is a flowchart of a method for scanning in accordance with an exemplary aspect of the disclosure.

FIG. 10 is a flowchart for intelligent LiDAR scanning in different areas around the machine in accordance with an exemplary aspect of the disclosure.

Regarding FIG. 10, in S1001, the controller 201 may monitor the speed and direction of the machine 10. When it is determined that the machine 10 is moving in reverse direction (NO in S1003), in S1013, the LiDAR 32 may scan in the rear of the machine 10 at a high frame rate. Also, the LiDAR 32 may scan in the forward direction at a low frame rate.

When it is determined that the machine 10 is moving forward (YES in S1003), in S1007, a determination may be made as to whether the speed of the machine 10 is greater than a threshold speed. The threshold speed may depend on the environment that the machine 10 is operating. In the case of the machine 10 performing tasks in a work site, the threshold speed may be about 20 to 35 mph, for instance. On the other hand, in an environment in which the machine 10 is moving on a smooth road (e.g., non-off road), the threshold speed may be about 50 to 60 mph, for instance. When it is determined that the speed of the machine 10 is lower than the threshold speed (NO in S1007), in S1009, the LiDAR 32 may scan in the rear of the machine 10 at a regular frame rate. Also, the LiDAR 32 may scan a side view of the machine 10 at a regular frame rate.

When it is determined that the speed of the machine 10 is greater than the threshold speed (YES in S1007), in S1011, the LiDAR 32 may scan in the rear of the machine 10 at a low frame rate. Also, in S1015, the LiDAR 32 may perform scanning in the forward field of view at a high frame rate.

In some embodiments, a low frame rate may be once every second, a regular frame rate may be 5 to 10 frames per second, and a high frame rate may be greater than 10 frames per second. Also, high resolution scanning may be directed to a region of interest based on objects identified in semantically labeled point clouds.

As noted above, LiDAR scanning may be electronically controlled for scanning rate and resolution. Semantic labels of 3D point clouds in S913 of FIG. 9 may be used to direct scanning rate and angular resolution of LiDAR scanning. In an effort to accomplish early detection of distant objects while the work machine is operating at a speed above the threshold speed, in S1007, the high resolution image of the camera 40 may be cropped in image preprocessing 307 into one or more high resolution cropped images, for example cropping images along a horizontal strip of the original image. The cropped high resolution images may be input to the machine learning model 309, which, in S909, may assign semantic labels to detected objects.

To take advantage of the high resolution cropping operation, the processor 213 may only have to send, e.g., twelve cropped images, to the machine learning model 309, and the model may need to process the original image plus maybe ten or twelve more images so that the processing will only be over about thirteen 512×512 images per frame (e.g., see FIG. 7). However, provided a semantically labeled image from a previous iteration frame, the processor 213 may only need to down sample the original image plus two or three more cropped images per frame (see FIG. 8). This would reduce the number of high resolution down sampled images by about a quarter.

Figure 11:
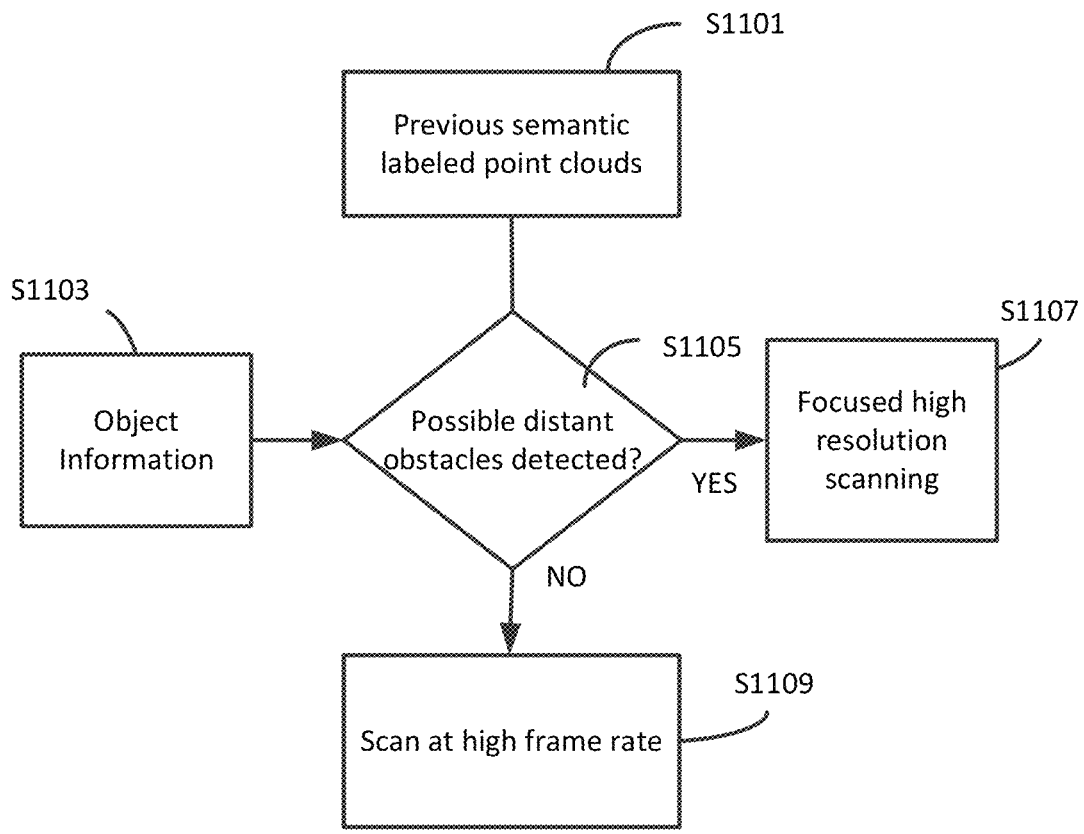
FIG. 11 is a flowchart.

FIG. 11 is a flowchart for intelligent LiDAR scanning for distant objects in accordance with an exemplary aspect of the disclosure.

In the full image of a scene, there may be a lot of information that is not necessary. The important information may be the road region of a scene. Initially, at a distance of greater than 200 meters ahead of the machine 10, the LiDAR 32 would provide only a few points for a person or other obstacle on a road ahead. Also, at this distance, the high resolution camera 40 may not have high enough resolution to detect the person. Subsequently, processing 311 of the semantically labeled point cloud may automatically remove regions in an image scene, or some regions may be tagged for low resolution scanning. In an example, the sky object may be automatically removed, and a horizontal strip may remain for the horizon view. The preprocessed image 307 may be an image with unimportant regions removed and a cropped horizontal strip (S921). At this iteration, in S909, the machine learning model 309 will classify objects in the horizontal strip of the image scene including the road object. The result of the machine learning model 309 may include a semantic label for the person such that the LiDAR 32 may adjust resolution focus and perform scanning of the person object at a high resolution.

Regarding FIG. 11, in S1101, information of possible distant objects may be obtained from previous image frames. In addition, in S1103, information of distant objects may be obtained from other machines, from other sensors via a cloud service, of from a central computer system. Object information in S1103 may include a labeled point cloud for an object that is out of range of the machine's LiDAR 32, or at least an object that has not been identified by the camera 40 and machine learning model 309. Objects that may be considered as obstacles may include large rocks, boulders, people, animals that may be in the path of the machine 10, or at least any object that may cause damage to the machine or injury to a person or animal.

When a possible obstacle is detected (YES in S1105), in S1107, the LiDAR 32 may adjust scanning to a focused resolution and scanning rate to scan a region containing the possible obstacle with high resolution while scanning other regions with low resolution and scanning rate.

For example, in a case that the machine 10 is driving down a road at 50 mph and there is a person in the road, the machine 10 should be made aware of the person as early as possible. Hence, embodiments of the disclosed subject matter can identify the person (or a region containing the person) and focus high resolution of the LiDAR 32 on the person or the region containing the person.

When the machine 10 is operating at a speed above the speed threshold, but an obstacle is not detected (NO in S1105), in S1109, the LiDAR 32 may still scan the region corresponding to the horizontal strip at a high frame rate.

Figure 12:
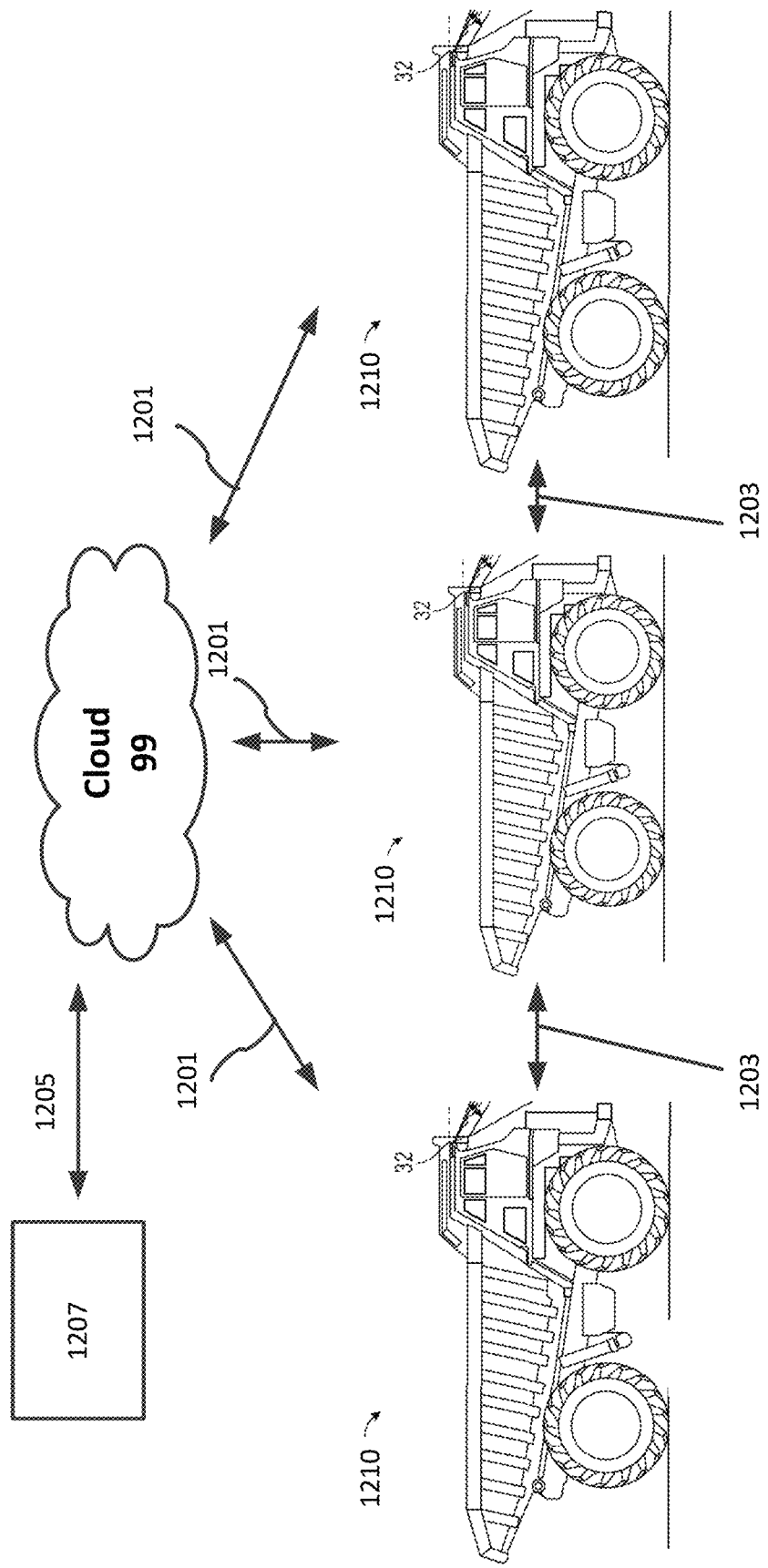
FIG. 12 is a system diagram for machines in communication between themselves and with a central computer system according to one or more embodiments of the disclosed subject matter.

FIG. 12 is a system diagram for machines 1210 in communication between themselves and with a central computer system.

In some embodiments, a group of machines 1210 may communicate with a central computer system 1207, a cloud service 99, or an on-site computer system. The machines 1210 may also communicate information between themselves using wireless communications 1203, or communicate with each other using a wireless communications service, such as cellular or WiFi 1201 via the cloud service 99 or other shared resource.

The central computer system 1207 may be a back office or central office where all the machines 1210 on a site are communicating via link 1205 with the central office, and then publishing information to the other machines. So even when machines 1210 are not able to get information directly from other machines 1210, they may receive information from the central computer system. Subsequently, not only is there local machine-to-machine communication, but there is also a high level communication that can be used to scan from sensors.

Provided this communications infrastructure, a second machine may broadcast information indicating that another machine is driving down the road toward the present machine 10 (e.g., right-most machine 1210). The machine 10 may receive this information from the central computer system 1207 and use that information either as input to the machine learning model 309 and fused with LiDAR 3D point clouds 311, or as semantically labeled 3D point clouds provided in S911.

This information may be used to direct more LiDAR points, for example direct the LiDAR points to information in the 3D space that is coming from a separate machine by way of the central computer system.

Focused high resolution scanning, S1107, may be adjusted at each scan. However, in some cases, an adjusted scan pattern may result in applying too many pulses to a certain area, which violate eye safety parameters of the LiDAR. Certain power levels and wavelengths are more safe than others. Some power levels and wavelengths may cause damage. In some embodiments, the focused high resolution scanning, S1107, may limit the power level, pulse duration, or scanning rate to a safe level of the LiDAR.

Thus, it is to be understood that the description and drawings presented herein represent presently preferred embodiments and are therefore representative of the subject matter which is broadly contemplated by the present disclosure. It is further understood that the scope of the present disclosure fully encompasses other embodiments that may become obvious to those skilled in the art.

It will be understood that the benefits and advantages described above may relate to one embodiment or may relate to multiple embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The invention claimed is:

1. An intelligent three dimensional scanner system mountable on a movable machine, comprising:
 a three dimensional scanner;
 a camera; and
 control circuitry configured to:
   receive three dimensional point data from the three dimensional scanner,
   receive two dimensional image data from the camera,
   input the two dimensional image data to a machine learning model, which identifies objects in the two dimensional image data,
   fuse the three dimensional point data with the identified objects in the two dimensional image data in order to identify the objects in the three dimensional point data,
   receive semantically labeled three dimensional point data from a source located offboard the movable machine, and
   control a scan pattern to direct scanning resolution of the three dimensional scanner based on the identified objects,
   wherein the control to direct the scan pattern includes dynamically adjusting the scan pattern to direct the scan pattern by at least one light detection and ranging device only on selected ones of identified objects in the received semantically labeled three dimensional point data.

2. The intelligent three dimensional scanner system of claim 1, wherein the control circuitry is configured to calibrate the three dimensional scanner relative to a position of the camera and a location of the movable machine and fuse the three dimensional point data with the identified objects based on the calibration of the three dimensional scanner relative to the camera.

3. The intelligent three dimensional scanner system of claim 1, wherein the machine learning model is a deep learning neural network that takes the two dimensional image data as input and outputs the identified objects and semantic labels for the identified objects.

4. The intelligent three dimensional scanner system of claim 1,
 wherein the three dimensional scanner is a light detection and ranging device,
 wherein the scanning resolution is a number of measurements by the light detection and ranging device in a field of view of the light detection and ranging device, and
 wherein the control circuitry is configured to selectively control the number of measurements for each of the identified objects.

5. The intelligent three dimensional scanner system of claim 1,
 wherein the three dimensional scanner is a 4D imaging radar,
 wherein the scanning resolution is a number of measurements by the 4D imaging radar in a field of view of the 4D imaging radar, and
 wherein the control circuitry is configured to selectively control the number of measurements for each of the identified objects.

6. The intelligent three dimensional scanner system of claim 1, wherein the control of the scan pattern of the three dimensional scanner is based on the identified Objects of previous two dimensional image data.

7. The intelligent three dimensional scanner system of claim 1,
 wherein the control circuitry is configured to perform image preprocessing on the two dimensional image data, and
 wherein the image preprocessing includes down sampling from the two dimensional image data to a reduced two dimensional image data having a number of pixels that match the two dimensional image data input to the machine learning model.

8. The intelligent three dimensional scanner system of claim 1,
wherein the control circuitry is configured to perform image preprocessing on the two dimensional image data, and
wherein the image preprocessing includes cropping the two dimensional image data to obtain a cropped two dimensional image having a number of pixels that match the two dimensional image data input to the machine learning model.

9. The intelligent three dimensional scanner system of claim 8,
wherein the cropped two dimensional image data includes at least one of the identified objects, and
wherein the control circuitry is configured to control the scan pattern of the three dimensional scanner in a region corresponding to the cropped two dimension, image data.

10. The intelligent three dimensional scanner system of claim 1, wherein the control circuitry is configured to receive information of the identified objects from an external source and control a number of measurements for the identified objects received from the external source.

11. The intelligent three dimensional scanner system of claim 1, wherein the control circuitry is configured to monitor speed and direction of movement of the movable machine, and control of the scan pattern of the three dimensional scanner based on the speed and direction of movement of the movable machine.

12. A mobile work machine, comprising:
at least one camera;
at least one light detection and ranging device and an associated scanner controller;
an embedded machine learning circuit; and
control circuitry configured to:
receive in a first frame a two dimensional image from the at least one camera, perform image preprocessing on the received two dimensional image to conform to an input of the embedded machine learning circuit, and
use the embedded machine learning circuit to identify objects in the preprocessed two dimensional image, and to semantically label the identified objects, wherein the control circuitry is further configured to:
receive three dimensional point data from the at least one light detection and
ranging device, and
fuse the three dimensional point data with the identified objects in the two dimensional image in order to identify the objects in the three dimensional point data, and
wherein the scanner controller is configured to dynamically adjust a scan pattern to direct high resolution scanning by the at least one light detection and ranging device only on selected ones of the identified objects and to perform low resolution scanning on others of the identified objects,
wherein the mobile work machine is used to perform tasks in a mining operation in which a plurality of other mobile work machines perform mining tasks,
wherein the plurality of other mobile work machines communicate between each other and with the mobile work machine,
wherein the plurality of other mobile work machines and the mobile work machine communicate with a central computer system,
wherein the control circuitry of the mobile work machine receives semantically labeled three dimensional point data from the central computer system, and
wherein the scanner controller is configured to dynamically adjust the scan pattern to direct the high resolution scanning by the at least one light detection and ranging device only on selected ones of identified objects in the semantically labeled three dimensional point data received from the central computer system.

13. The work machine of claim 12,
wherein one of the plurality of other mobile work machines is configured to transmit information indicating that another of the plurality of other mobile work machines is traveling on a road, and
wherein when the road is a road over which the mobile work machine is traveling, the control circuitry receives semantically labeled three dimensional point data for said another of the plurality of other mobile work machines that is traveling on the road from the central computer system.

14. The work machine of claim 12,
wherein the control circuitry is configured to monitor speed and direction of movement of the mobile work machine, and
wherein the scanner controller is configured to control scanning frequency of the at least one light detection and ranging device based on the speed and direction of movement of the mobile work machine.

15. The work machine of claim 14, wherein the scanner controller is configured to increase scanning frequency of the at least one light detection and ranging device in a rear field of view of the mobile work machine when the direction of movement of the mobile work machine is determined to be reverse.

16. The work machine of claim 14, wherein the scanner controller is configured to increase the scanning frequency of the at least one light detection and ranging device in a forward field of view of the mobile work machine and decrease scanning frequency in a rear field of view of the mobile work machine when the speed of movement of the mobile work machine is greater than a predetermined speed threshold.

17. The work machine of claim 12, wherein the scanner controller is configured to dynamically adjust the scan pattern to direct the high resolution scanning by the at least one light detection and ranging device only on selected ones of the identified objects, with limited laser light power level, laser light pulse duration, and scanning rate to within a safe level for human eyes.

18. An intelligent scanning method, comprising:
receiving, using a controller, a two dimensional image from at least one camera of a mobile work machine;
identifying, using an embedded machine learning circuit, objects in the two dimensional image, and semantically labeling the identified objects;
receiving, using the controller, three dimensional point data from a light detection and ranging device of the mobile work machine,
fusing, using the controller, the three dimensional point data with the identified objects in the two dimensional image in order to identify the objects in the three dimensional point data, processing semantically labeled three dimensional point data received from a source located offboard the mobile work machine, and while the mobile work machine is moving in a worksite, dynamically adjusting a scan pattern of the light detection and ranging device, using a scanner controller of the mobile work machine, using the semantically labeled three dimensional point data, to direct high resolution scanning by the light detection and ranging device only on selected ones of the identified objects and to direct low resolution scanning on others of the identified objects.

19. The method according to claim 18, wherein said identifying using the embedded machine learning circuit comprises:

determining a plurality of features of the two dimensional image using a convolution neural network having a plurality of convolution layers;

recognizing a bounding-box for an object;

predicting an object class for the object; and segmenting the object in the two dimensional image.

20. The method according to claim 18, wherein the mobile work machine is used to perform tasks in a mining operation in which a plurality of other mobile work machines perform mining tasks, wherein the plurality of other mobile work machines communicate between each other and with the mobile work machine, and wherein the method further comprises the controller of the mobile work machine receiving the semantically labeled three dimensional point data from a central computer system as the source located offboard the mobile work machine.

* * * * *